C. L. Vasques,
Gas Meter,
Nº 27,847.                    Patented Apr. 10, 1860.
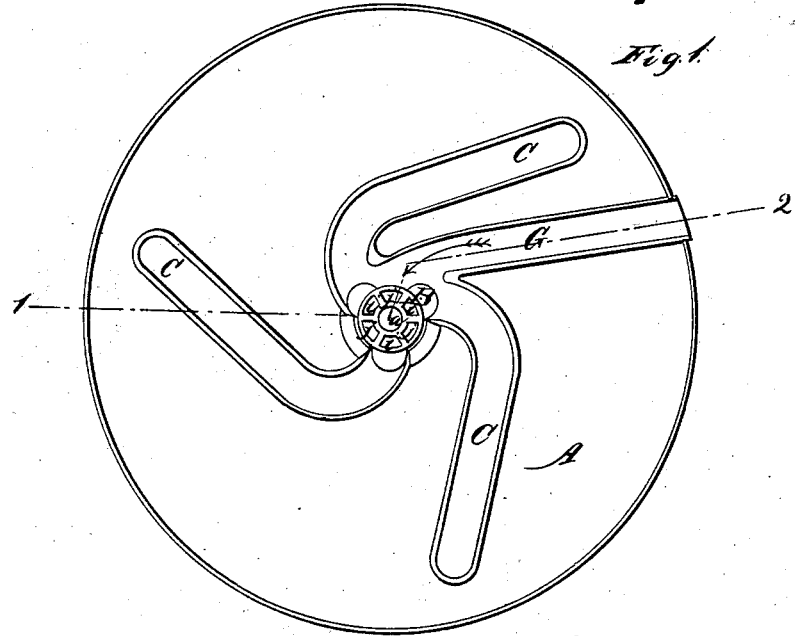
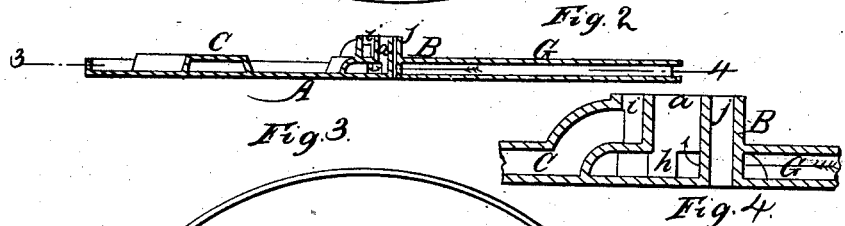
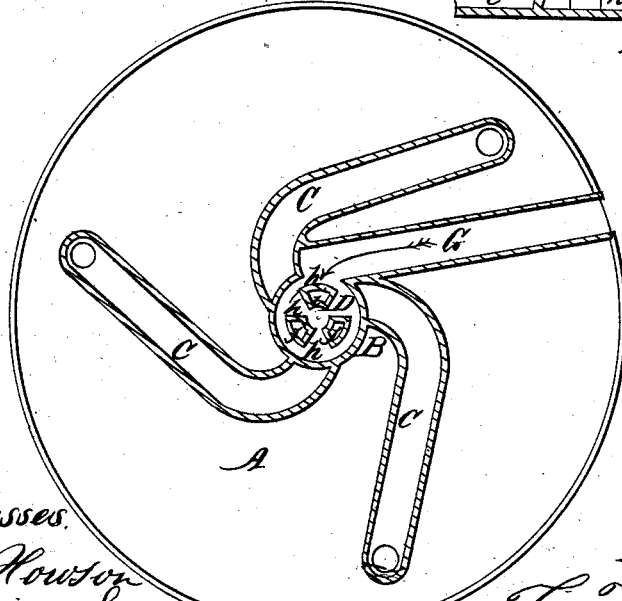
Witnesses
Henry Howson
Horace See
Inventor
C. L. Vasques

UNITED STATES PATENT OFFICE.

C. L. VASQUEZ, OF PHILADELPHIA, PENNSYLVANIA, ASSIGNOR TO R. H. GRATZ, OF SAME PLACE.

DRY GAS-METER.

Specification of Letters Patent No. 27,847, dated April 10, 1860.

*To all whom it may concern:*

Be it known that I, CHARLES LARGA VASQUES, of the city and county of Philadelphia and State of Pennsylvania, have invented a new and useful Improvement in Dry Gas-Meters; and I do hereby declare the following to be a full, clear, and exact description of the same, reference being had to the accompanying drawing and to the letters of reference marked thereon.

My invention relates to an improvement in that class of dry gas meters which have six measuring compartments formed by three radial partitions and three yielding diaphragms, the latter operating in conjunction with a revolving valve, and my invention consists in forming between the level of the valve seat and the measuring compartments a chamber and inlet pipe arranged substantially in the manner described hereafter so as to convey the gas to the central opening of the valve seat, and so as to afford a means of drawing off the condensed vapor without incroaching upon the necessary space occupied by the measuring chambers, and without interfering with the proper action of the diaphragms.

In order to enable others skilled in this class of meters to make and use my invention, I will now proceed to describe its construction and operation.

On reference to the accompanying drawing which forms a part of this specification, Figure 1, is a plan view of sufficient of a dry gas meter to illustrate my improvement. Fig. 2, a vertical section of Fig. 1, on the line 1, 2. Fig. 3, a sectional plan on the line 3, 4 Fig. 2. Fig. 4, a part of Fig. 2 drawn on an enlarged scale.

Similar letters refer to similar parts throughout the several views.

A is that plate of a dry gas meter which separates the measuring compartments and their diaphragms from what is termed the galley.

B is the valve seat having a central opening *a* and, surrounding the latter, six openings *i i* and *j j*, into one or other of which, alternately, the gas is caused to pass from the central opening by means of a rotating valve of the ordinary construction or one similar to that described in the patent granted to W. Hopper and R. H. Gratz, June 22d 1858, and reissued June 28th 1859. Each opening *i* in the valve seat communicates through a passage C, with one of the compartments of the meter in front of its diaphragm, and each opening *j* with one of the compartments on the inside of its diaphragm.

A central chamber D communicating with the central opening *a*, is formed beneath the valve seat and in this chamber are three projections *h* through which as well as through the plate A, the openings *j* are continued, and by which the said openings are separated from the central chamber D.

G is the inlet pipe through which the gas passes into the central chamber whence it is conducted through the central opening *a* into one or the other of the openings *i* or *j* to the compartments of the meter by means of the valve, the construction and operation of which is too well understood by those fmiliar with this class of meters, to need description or illustration.

Various plans more or less complicated and costly as regards construction, have been devised for conveying the gas from the outside of the meter to the central opening *a*, with the view of avoiding all interference with the measuring compartments and their diaphragms, and of affording a free escape for the condensed vapors, which, especially when frozen, are apt to interfere with the proper action of the valve.

It will be seen that the pipe G, formed on the plate A, affords a direct and simple means of conveying the gas to the chamber D and central opening *a*, that the chamber being situated directly below the valve seat, all condensed vapors which may reach the latter, fall clear of the seat to the bottom of the chamber, from whence they pass away through the pipe G, the latter being so situated as not to interfere with the proper capacity of any of the measuring compartments, or with the proper action of the diaphragms within the same.

I claim as my invention and desire to secure by Letters Patent.

Forming between the level of the valve seat and the measuring compartments of a dry gas meter, a chamber D and an inlet pipe G, communicating with the same, both pipe and chamber being arranged in respect to the plate A substantially as and for the purpose herein set forth.

In testimony whereof, I have signed my name to this specification before two subscribing witnesses.

C. L. VASQUEZ.

Witnesses:
 HENRY HOWSON,
 CHARLES HOWSON.